US012755549B2

(12) United States Patent
Dhamija et al.

(10) Patent No.: US 12,755,549 B2
(45) Date of Patent: Oct. 6, 2026

(54) METHOD AND SYSTEM FOR TESTING VIDEO ANALYTICS OF A VIDEO SURVEILLANCE SYSTEM

(71) Applicant: Honeywell International Inc., Charlotte, NC (US)

(72) Inventors: Vijay K. Dhamija, Cumming, GA (US); Somnath Ghosh, Cumming, GA (US); Lalitha M. Eswara, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 466 days.

(21) Appl. No.: 18/334,068

(22) Filed: Jun. 13, 2023

(65) Prior Publication Data

US 2024/0420479 A1 Dec. 19, 2024

(51) Int. Cl.
*G06V 20/20* (2022.01)
*G06F 16/334* (2025.01)
(Continued)

(52) U.S. Cl.
CPC .......... *G06V 20/53* (2022.01); *G06F 16/3344* (2019.01); *G06T 7/20* (2013.01);
(Continued)

(58) Field of Classification Search
None
See application file for complete search history.

(56) References Cited

U.S. PATENT DOCUMENTS 9,836,933 B2 12/2017 Boghossian et al.
10,997,428 B2 * 5/2021 Winter .............. G06F 18/21355
(Continued)

FOREIGN PATENT DOCUMENTS

DE 102019111883 A1 7/2019
WO WO-2022067342 A2 * 3/2022 ........... G06F 3/0484
WO WO-2024186350 A1 * 9/2024 ......... G06Q 30/0639

OTHER PUBLICATIONS

Taylor et al., "OVVV: Using Virtual Worlds to Design and Evaluate Surveillance Systems," IEEE Explore, 8 pages, 2007. Accessed Dec. 29, 2022.

(Continued)

*Primary Examiner* — Tyler W. Sullivan
(74) *Attorney, Agent, or Firm* — Seager, Tufte & Wickhem, LLP

(57) ABSTRACT

Simulated objects are generated for display over a video stream by receiving a first user input that identifies one or more user identified regions relative to an image, tagging each of the one or more user identified regions with a corresponding region tag, receiving a second user input that is used to identify one or more simulation parameters, and identifying one or more simulation parameters based at least in part on the second user input. The method includes determining a plurality of characteristics of the simulated objects based on the simulation parameters, user identified regions and region tags. The simulated objects are superimposed on the video stream to create an augmented video stream and the augmented video stream is processed using one or more video analytics algorithms to test the effectiveness of each of the one or more video analytics algorithms.

10 Claims, 13 Drawing Sheets

(51) Int. Cl.

| | |
|---|---|
| ***G06T 7/20*** | (2017.01) |
| ***G06V 20/52*** | (2022.01) |
| ***G06V 20/70*** | (2022.01) |
| ***G06V 40/20*** | (2022.01) |
| ***H04N 5/265*** | (2006.01) |
| *G06N 20/00* | (2019.01) |

(52) U.S. Cl.

CPC .............. *G06V 20/20* (2022.01); *G06V 20/70* (2022.01); *G06V 40/20* (2022.01); *H04N 5/265* (2013.01); *G06N 20/00* (2019.01); *G06T 2207/20104* (2013.01); *G06T 2207/30242* (2013.01)

(56) References Cited

U.S. PATENT DOCUMENTS

2010/0091036 A1 4/2010 Wright et al.
2015/0310643 A1* 10/2015 Rzeszotarski ........... G06T 13/80 345/441
2017/0372575 A1 12/2017 Boghossian et al.
2018/0350144 A1* 12/2018 Rathod ................... H04L 51/10
2021/0383132 A1* 12/2021 Carey .................... G06V 20/53
2023/0281527 A1* 9/2023 Cella ...................... G06V 20/17 705/7.17

OTHER PUBLICATIONS

Cambridge Pixel: "SPx Video Simulator", Jan. 4, 2023, XP093217264, Retrieved from the Internet: URL:https://www.youtube.corn/watch?v=BLOEzenu7zQ [retrieved on Oct. 22, 2024].

Cambridge Pixel: "SPx Video Simulator", Jan. 4, 2023, pp. 1-2, XP093217261, Retrieved from the Internet: URL:https://cambridgepixel.corn/site/assets/files/7470/spx-video-simulator-datasheetcp-16-173-03.pdf [retrieved on Oct. 22, 2024].

Cambridge Pixel: "SPx Radar Simulator", Aug. 5, 2022, pp. 1-8, XP093217248, Retrieved from the Internet: URL:https://cambridgepixel.corn/site/assets/files/7488/spx-radar-simulator-brochure-c p-16-110-118.pdf [retrieved on Oct. 22, 2024].

Extended European Search Report, EP Application No. 24177430.6, European Patent Office, Nov. 6, 2024 (12 pages).

* cited by examiner

METHOD AND SYSTEM FOR TESTING VIDEO ANALYTICS OF A VIDEO SURVEILLANCE SYSTEM

TECHNICAL FIELD

The present disclosure relates generally to video surveillance systems. More particularly, the present disclosure relates to testing video analytics of video surveillance systems.

BACKGROUND

A number of video surveillance systems employ video cameras that are installed or otherwise arranged around a surveillance area such as a city, a portion of a city, a facility or a building. Video surveillance systems may also include mobile video cameras, such as drones carrying video cameras. Video surveillance systems may employ a variety of different detection algorithms using video analytics. What would be desirable are improved methods for testing the video analytics of video surveillance systems.

SUMMARY

The present disclosure relates generally to video surveillance systems and more particularly to testing video analytics of video surveillance systems. An example may be found in a computer implemented method for testing one or more video analytics algorithms of a video surveillance system. The video surveillance system includes a video camera having a field of view (FOV) that encompasses part of a facility (or other area). The illustrative method includes generating simulated objects that are to be superimposed on a video stream captured by the video camera, wherein generating the simulated objects includes displaying an image captured by the video camera on a display, receiving a first user input that identifies one or more user identified regions relative to the image, tagging each of the one or more user identified regions with a corresponding region tag, receiving a second user input that is used to identify one or more simulation parameters, and identifying one or more simulation parameters based at least in part on the second user input. Based at least in part on the one or more simulation parameters and one or more of the user identified regions and corresponding region tags, the method includes determining a plurality of characteristics of the simulated objects including one or more of a quantity of the simulated objects in the FOV, a distribution of the simulated objects in the FOV, a starting point for each of the simulated objects in the FOV, and a movement of each of the simulated objects in the FOV. The method includes superimposing the simulated objects on the FOV of the video stream captured by the video camera to create an augmented video stream and processing the augmented video stream using one or more video analytics algorithms to test the effectiveness of each of the one or more video analytics algorithms.

Another example may be found in a computer implemented method for testing one or more video analytics algorithms of a video surveillance system, where the video surveillance system includes a video camera having a field of view (FOV) that encompasses part of a facility (or other region). The illustrative method includes generating simulated objects that are to be superimposed on a video stream captured by the video camera, wherein generating the simulated objects includes receiving a user input that identified a particular video analytics algorithm from a plurality of video analytics algorithm, and based at least in part on the particular video particular video analytics algorithm identified by the user input, determining a plurality of characteristics of the simulated objects including one or more of a quantity of the simulated objects in the FOV, a distribution of the simulated objects in the FOV, a starting point for each of the simulated objects in the FOV, and a movement of each of the simulated objects in the FOV. The method includes superimposing the simulated objects on the FOV of the video stream captured by the video camera to create an augmented video stream and processing the augmented video stream using the particular video analytics algorithm identified by the user input to test the effectiveness of the particular video particular video analytics algorithm.

Another example may be found in a computer implemented method for testing a video surveillance system including a video camera having a field of view (FOV) that encompasses a region of a facility (or other region). The illustrative method includes generating simulated objects that are to be superimposed on a video stream captured by the video camera, wherein generating the simulated objects includes receiving from a user a voice or text based description of one or more scenarios to be tested. Based at least in part on the voice or text based description of the one or more scenarios to be tested, the method includes determining a plurality of characteristics of the simulated objects including one or more of a quantity of the simulated objects in the FOV, a distribution of the simulated objects in the FOV, a starting point for each of the simulated objects in the FOV, and a movement of each of the simulated objects in the FOV. The method includes superimposing the simulated objects on the FOV of the video stream captured by the video camera to create an augmented video stream and processing the augmented video stream to test the one or more scenarios described in the voice or text based description.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
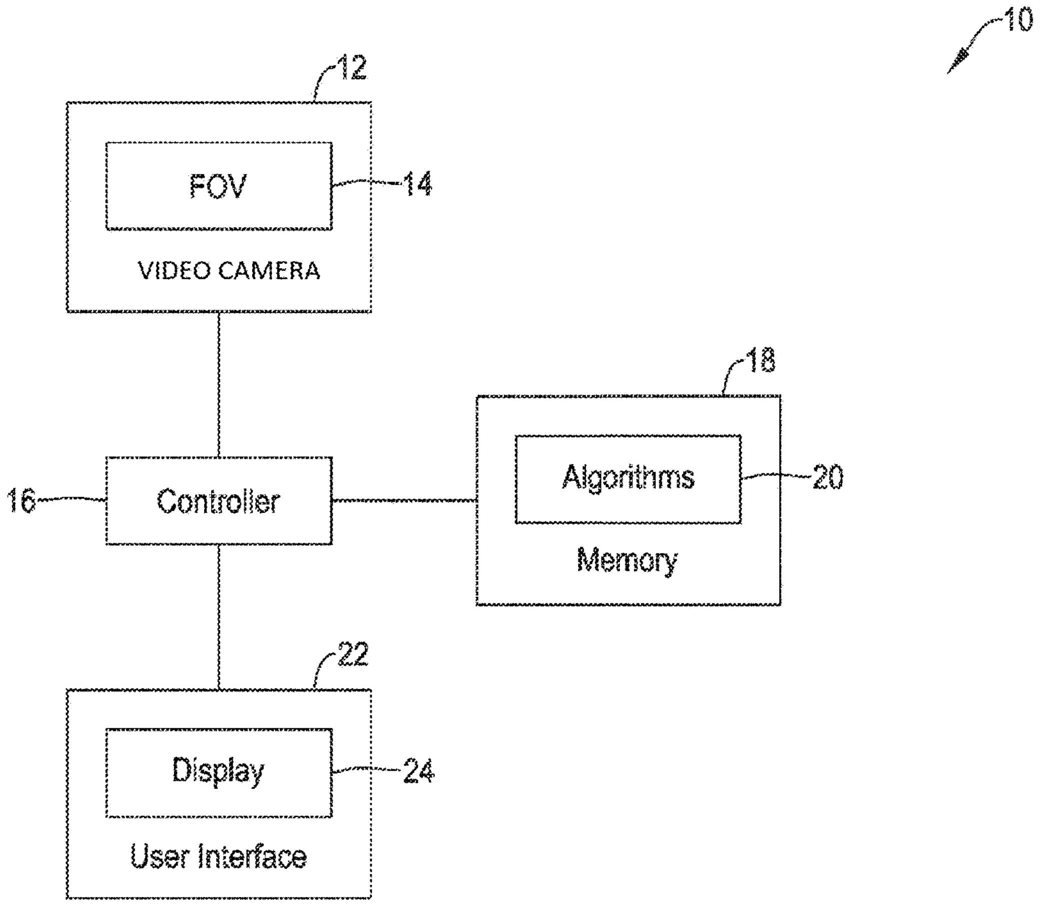
FIG. 1 is a schematic block diagram of an illustrative video surveillance system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/of" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative video surveillance system 10. The illustrative video surveillance system 10 may include a video camera 12. While a single video camera 12 is shown, it will be appreciated that the video surveillance system 10 may include a large number of video cameras 12. The video camera 12 has a Field of View (FOV) 14. The FOV 14 encompasses what the video camera 12 can see, or what physical region or area can be seen within a video stream produced by the video camera 12, for example. The video surveillance system 10 includes a controller 16 that is operably coupled with the video camera 12, such that a video stream produced by the video camera 12 may be transmitted to the controller 16.

The controller 16 is operably coupled with a memory 18. The memory 18 may be used for storing recorded video streams and video clips, for example. The memory 18 may be used for storing video analytics algorithms 20. The video analytics algorithms 20 may be used by the controller 16, for example, when analyzing a video stream or a recorded video clip. The video analytics algorithms 20 may include any of a variety of different video analytics algorithms 20, such as but not limited to one or more of a crowd detection algorithm (e.g. crowd present or forming), a crowd analytics algorithm (e.g. size of crowd, rate of crowd formation or dispersion, density of crowd, movement within the crowd, movement of the crowd, etc.), a people count algorithm (e.g. number of people in a defined region of interest of the FOV), a behavior detection algorithm (e.g. running, walking, loitering, yelling, shop lifting, protesting, damaging property, tailgating through a secure entry point, wearing a mask, social distancing, etc.), an intrusion detection algorithm (e.g. entering a secure area), a perimeter protection algorithm (e.g. crossing a security perimeter) and a tailgating detection algorithm (e.g. tailgating through a secure entry point). These are just examples.

The controller 16 is operably coupled with a user interface 22. The user interface 22 includes a display 24 that may be used for displaying a video stream, for example. The user interface 22 may also include data entry capability, such as a keyboard and mouse, that a user may use when entering information into the controller 16. In some cases, the user interface 22 may include a voice and/or text receiving device for receiving a natural language input, sometimes from a remote location. In some instances, at least some of the controller 16, the memory 18 and the user interface 22 may be manifested within a computer such as a PC or laptop. In some instances, the controller 16 and/or the memory 18 may be manifested in a computer server such as a cloud-based server. The controller 16 and/or the memory 18 may represent part of a distributed computer system, with part of the distributed computer disposed locally and part of the distributed computer disposed remotely.

Figure 2:
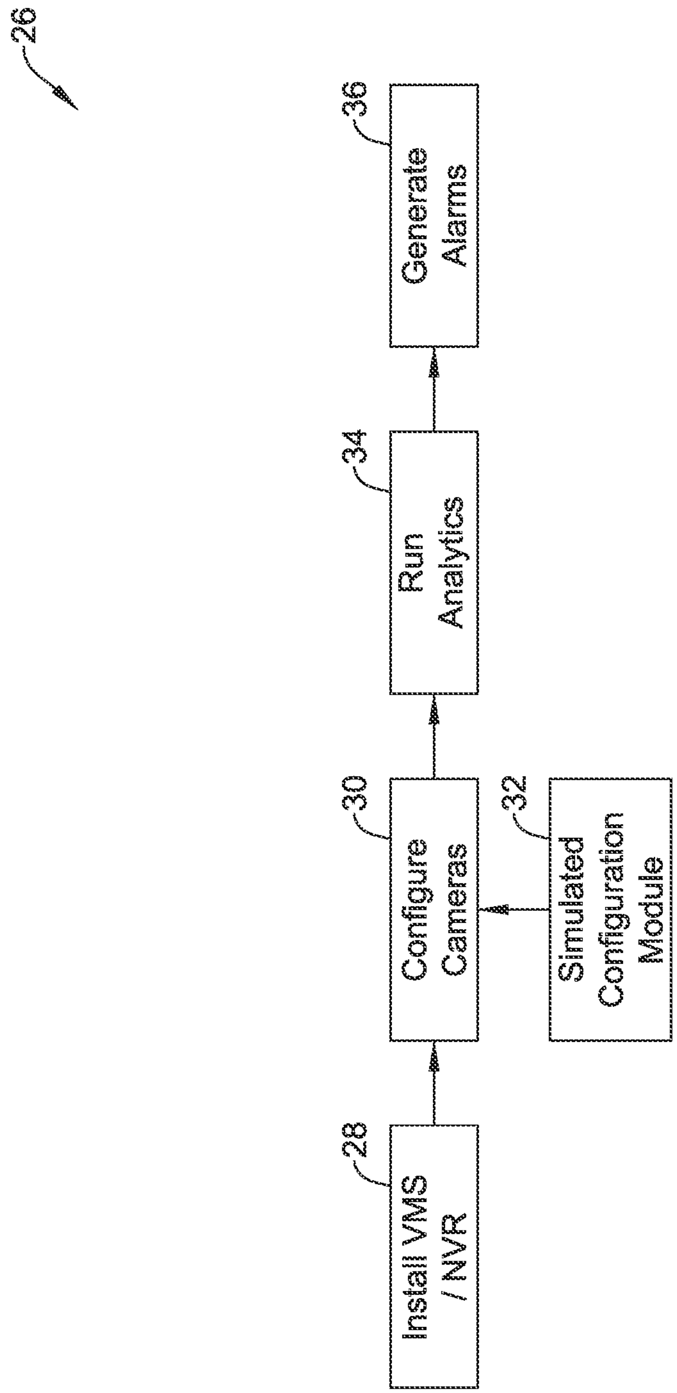
FIG. 2 is a schematic block diagram of an illustrative method for installing and configuring a video surveillance system at a site.

FIG. 2 is a schematic block diagram of an illustrative of an illustrative method 26 for installing and configuring a video surveillance system 10 at a site. The video surveillance system 10 may be installed, as indicated at block 28. This may include installing a VMS (Video Management System). This may include installing an NVR (Network Video Recorder), which is a specialized computer that is configured to record security video surveillance to a hard drive or other large storage device in a digital format. Cameras within the video surveillance system 10 may be installed and configured, as indicated at block 30. In some instances, configuring the cameras may include receiving input from a simulated configuration module 32. As will be discussed, in some instances it may be beneficial to include simulated objects within a video stream for testing particular video analytics algorithms, particularly when the video stream is directed to a portion of a facility that is largely unoccupied, and thus is not expected to include actual objects that can be used for testing the desired video analytics algorithms. For example, the video camera may be installed in a large warehouse that is largely unoccupied for extended periods of time. In some instances, adding simulated objects to the video stream provide something for the particular video analytics algorithms to find. Once the simulated objects are added, the video analytics may be run, as indicated at block 34. If simulated objects are detected, alarms may be generated, as indicated at block 36.

Figure 3:
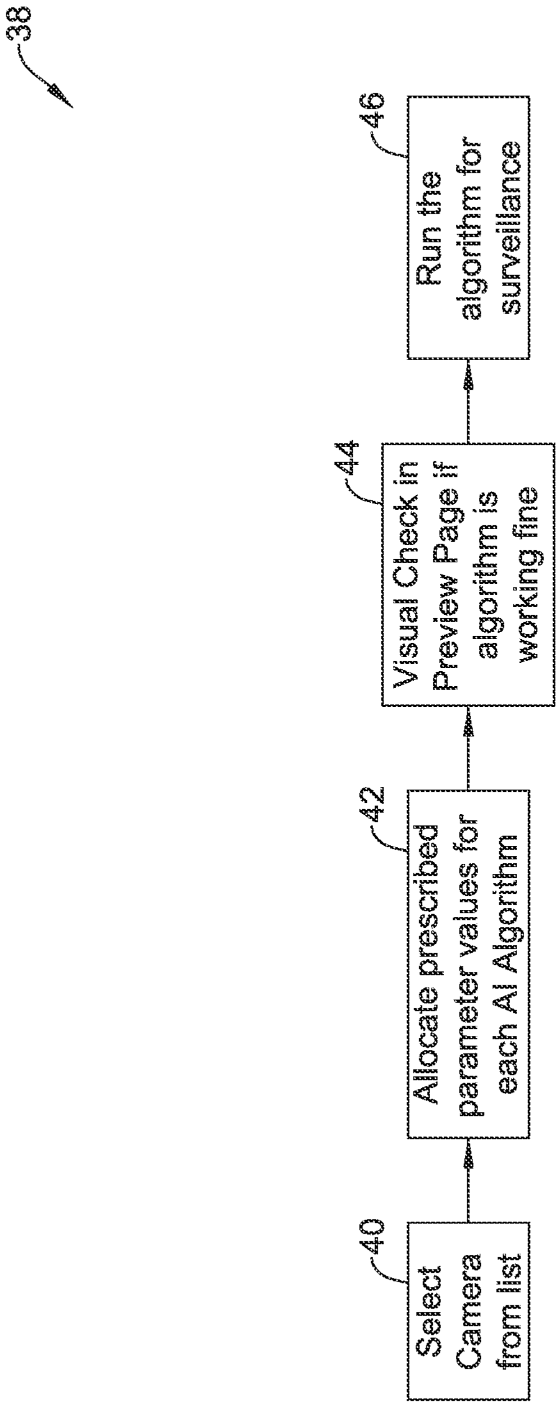
FIG. 3 is a schematic block diagram of an illustrative method for configuring a camera of a video surveillance system.

FIG. 3 is a schematic block diagram of an illustrative method 38 for configuring cameras as indicated at block 30 of FIG. 2. In some instances, the illustrate method may be implemented by the controller 16 of the video surveillance system 10. A camera may be selected for configuration, as shown at block 40. A variety of different video analytics algorithms, each using a variety of prescribed parameter values, may be used in analyzing a video stream from the selected camera. In some instances, these parameters may be allocated and defined, as indicated at block 42. Simulated objects may then be added to the video stream of the selected camera, and a visual check may be performed to see if the video analytics algorithm(s) are working correctly, as indicated at block 44. Once the installer is satisfied that the video analytics algorithm(s) is/are working correctly for the selected camera, the simulated objects may no longer be added to the video stream of the selected camera, and the video analytics algorithm(s) may be used to analyze the video stream from the camera during surveillance, as indicated at block 46.

Figure 4:
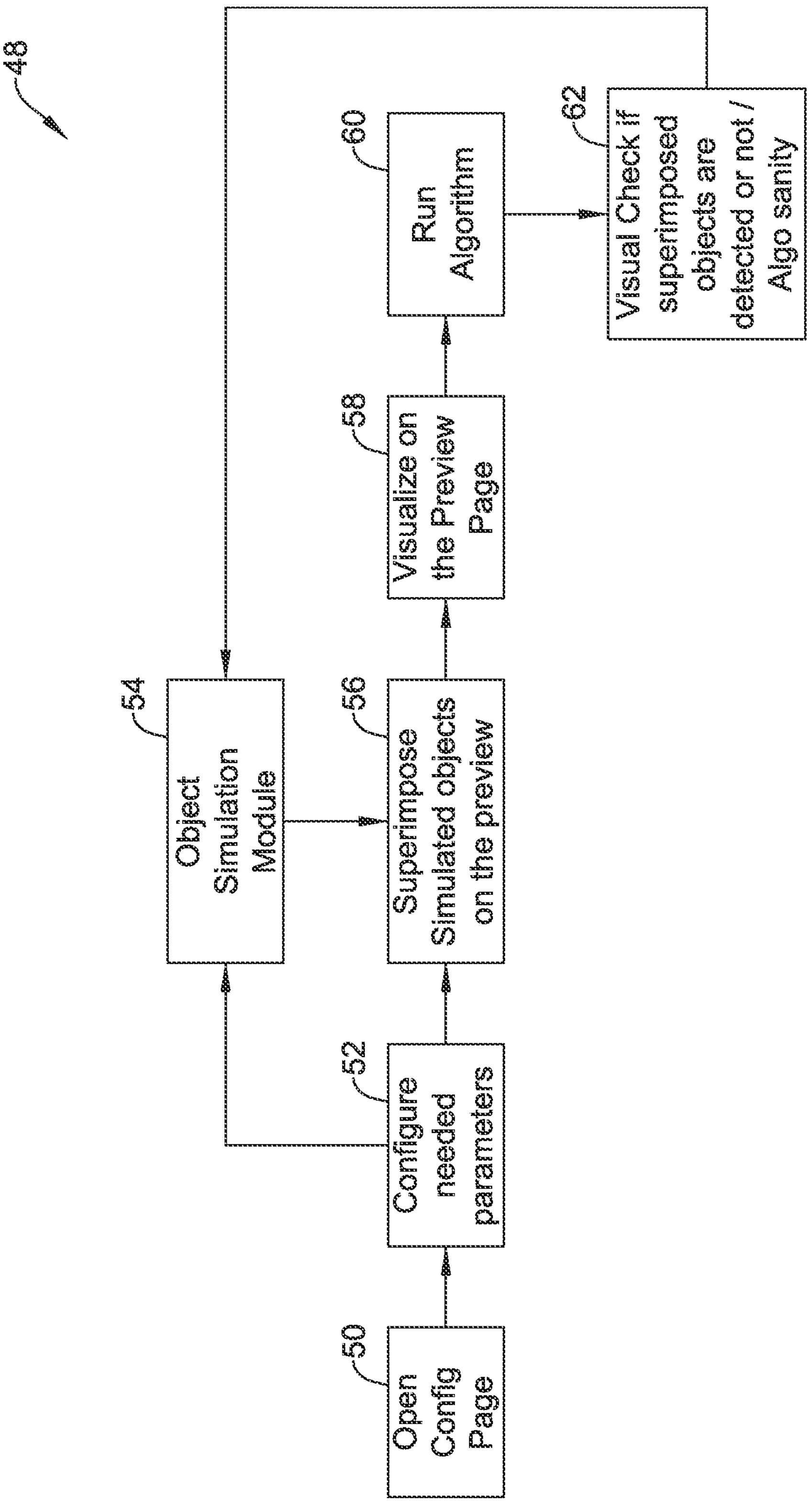
FIG. 4 is a schematic block diagram of an illustrative method for configuring a video surveillance system including testing one or more video analytics algorithms of the video surveillance system.

FIG. 4 is a schematic block diagram of an illustrative method 48 for configuring a video surveillance system including testing one or more video analytics algorithms of the video surveillance system. In some instances, the method 48 may be implemented by the controller 16 of the video surveillance system 10. A configuration page may be opened and displayed on the user interface 22 of FIG. 1, as indicated at block 50. Needed parameters may be configured using the user interface 22, as indicated at block 52. The configured parameters may be communicated to an Object Simulation Module 54 as well as to a block 56 where the simulated objects are superimposed on a preview that shows the objects superimposed on a video stream from a video camera of the video surveillance system. The preview may be considered as displaying an augmented video stream that augments the video stream from the video camera with the superimposed simulated objects.

The Object Simulation Module 54 generates simulated objects and movement of the simulated objects. The augmented video stream, including simulated objects moving in the field of view, is visualized, as indicated at block 58. One or more detection algorithms are run on the augmented video stream, as indicated at block 60. A visual check is run to see if the superimposed simulated objects are being detected as expected for the one or more video analytics algorithms being tested, as indicated at block 62. This may include a user watching the augmented video stream via the user interface 22 of FIG. 1 to see if the superimposed simulated objects are appropriately generated for the one or more video analytics algorithms being tested, and if so, whether alarms and/or other output from the one or more video analytics algorithms are appropriate.

Figure 5:
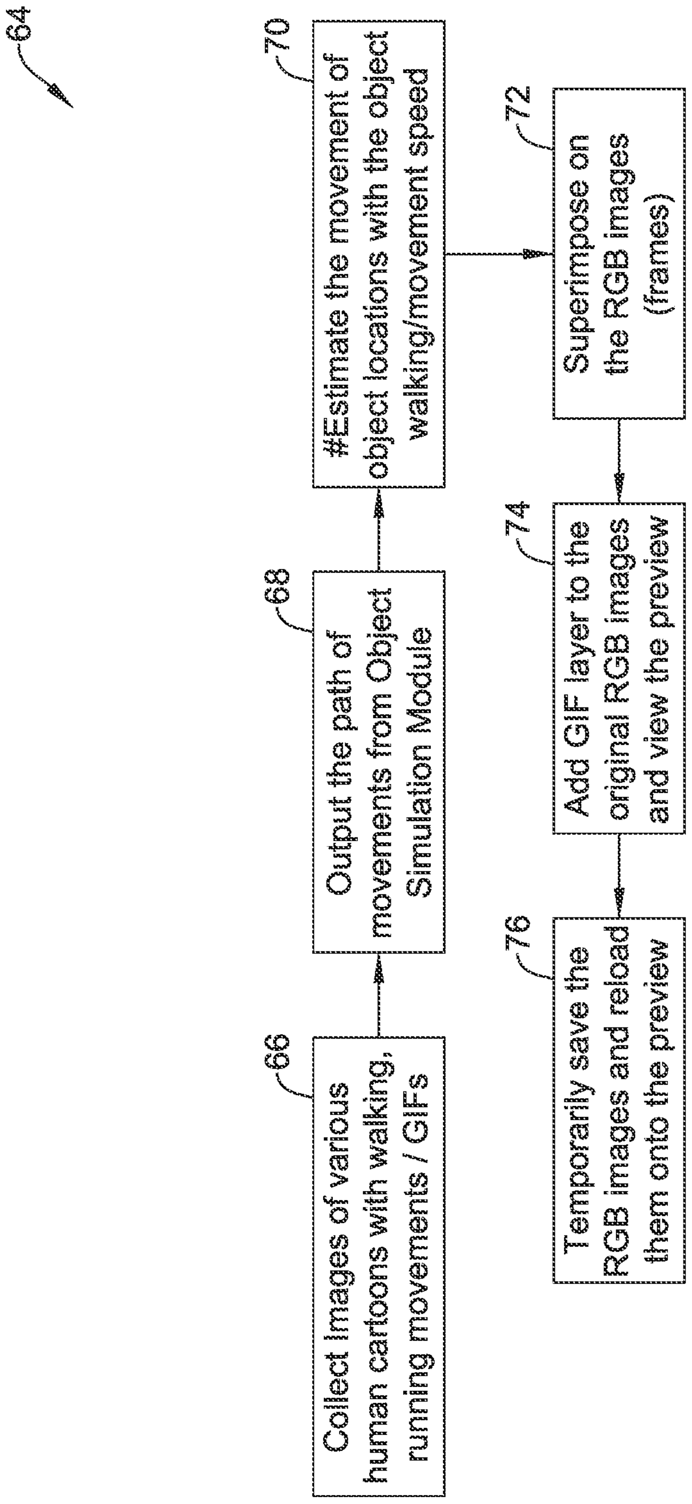
FIG. 5 is a schematic block diagram of an illustrative method for superimposing simulated objects onto a video stream to create an augmented video stream.

FIG. 5 is a schematic block diagram of an illustrative method 64 for superimposing simulated objects onto a video stream to create an augmented video stream. In some instances, the method 64 may be implemented by the controller 16 of the video surveillance system 10. Images of various objects, including people and/or vehicles, are collected, as indicated at block 66. The paths showing movement of the various objects are outputted, as indicated at block 68. The movement of object locations is estimated with the object walking/movement speed, as indicated at block 70. In some instances, the movements are provided by the Object Simulation Module 54 (FIG. 4). Movement of the objects within the FOV may be based on one or more simulation parameters. The simulation parameters may include one or more of an object type of one or more of the simulated objects, a measure related to a number of simulated objects, a distribution of two or more of the simulated objects, a starting point for one or more of the simulated objects, a speed of movement of one or more of the simulated objects, a variation in speed of movement of one or more of the simulated objects over time, a variation in speed of movement between two or more of the simulated objects, and a type of movement of one or more of the simulated objects. In some instances, the distribution of two or more of the simulated objects may include one or more of a Weilbull distribution, a Gaussian distribution, a Binomial distribution, a Poisson distribution, a Uniform distribution, a Random distribution, and a Geometric distribution. In some instances, the distribution of two or more of the simulated objects may include a mixed distribution of two or more different distributions. In some instances, the type of movement may include one or more of a random directional movement, a random directional movement constrained by movement of other simulated objects and/or constrained by user identified regions of the FOV, a directional movement along a predefined corridor, a varying speed movement, and a group movement associated with two or more of the simulated objects.

In some cases, one or more of the simulation parameters may be scaled by a scale factor that is dependent on the location of the simulated object in the FOV of the video camera. For example, for simulated objects that are in the upper part of the FOV, indicating that these objects are further from the video camera, the simulated objects may be smaller in size (smaller number of pixels) relative to similar objects that are in the lower part of the FOV. In another example, the speed of the simulated objects (across pixels) may be smaller for objects in the upper part of the FOV relative to similar objects that are in the lower part of the FOV. Moreover, in some cases, the scale factor may be dependent upon the placement of the camera and the size of the area being monitored. For example, for a video camera placed in a large warehouse with a FOV that covers a long distance, the scale factor may be greater than a video camera that is placed in a smaller confined room. The downward facing angle of the video camera may also be taken into account when determining the scale factor. In some cases, the scale factor is based on one or more inputs from a user.

The simulated objects, and their movement, are superimposed on the individual frames of the video stream, as indicated at block 72. A GIF layer may be added to the original RGB (Red Green Blue) images, and previewed, as seen at block 74. The RGB images with the superimposed objects are temporarily saved and reloaded into the preview, as indicated at block 76.

Figure 6A:
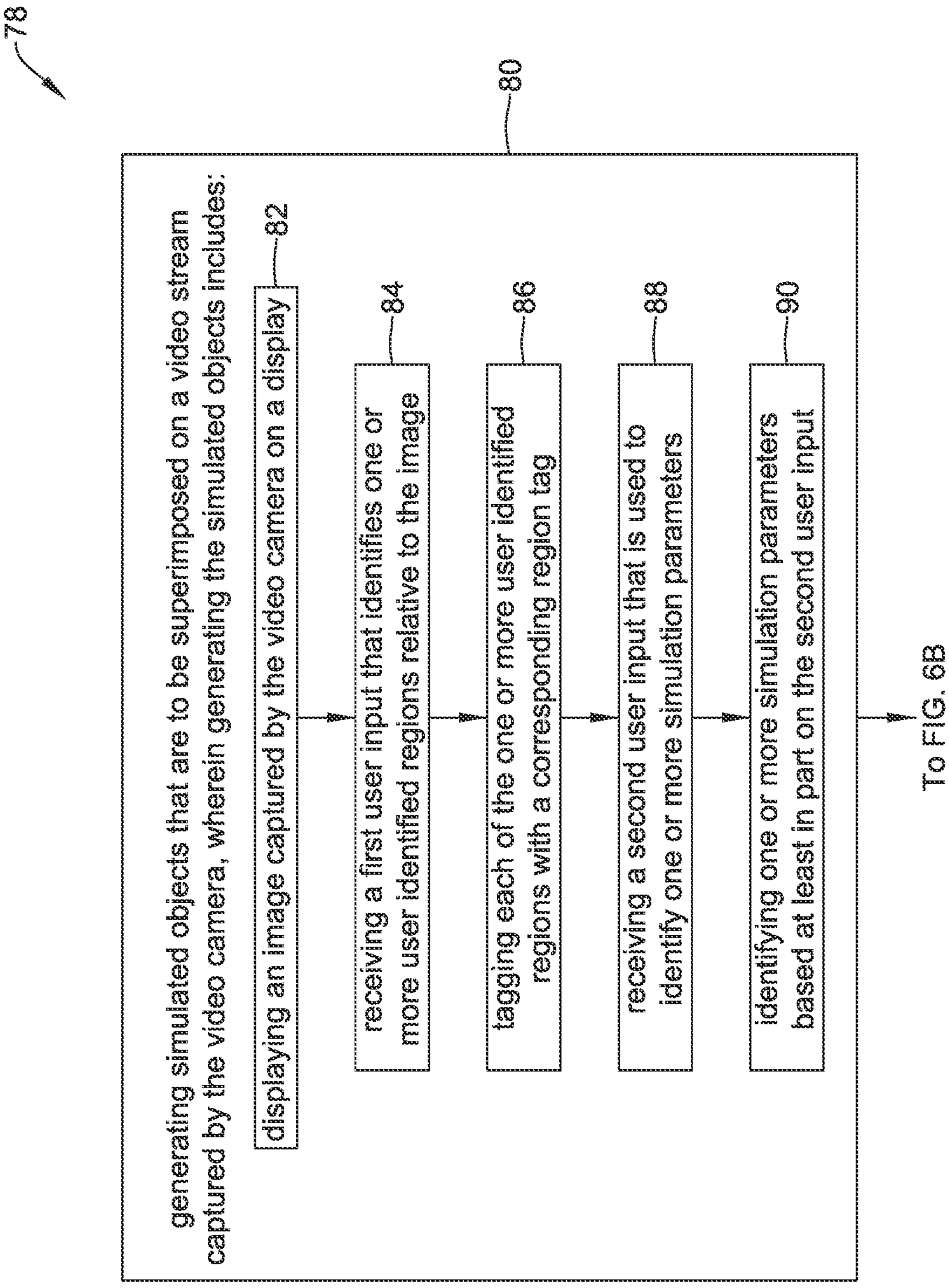
FIGS. 6A and 6B are flow diagrams that together show an illustrative computer implemented method.
Figure 6B:
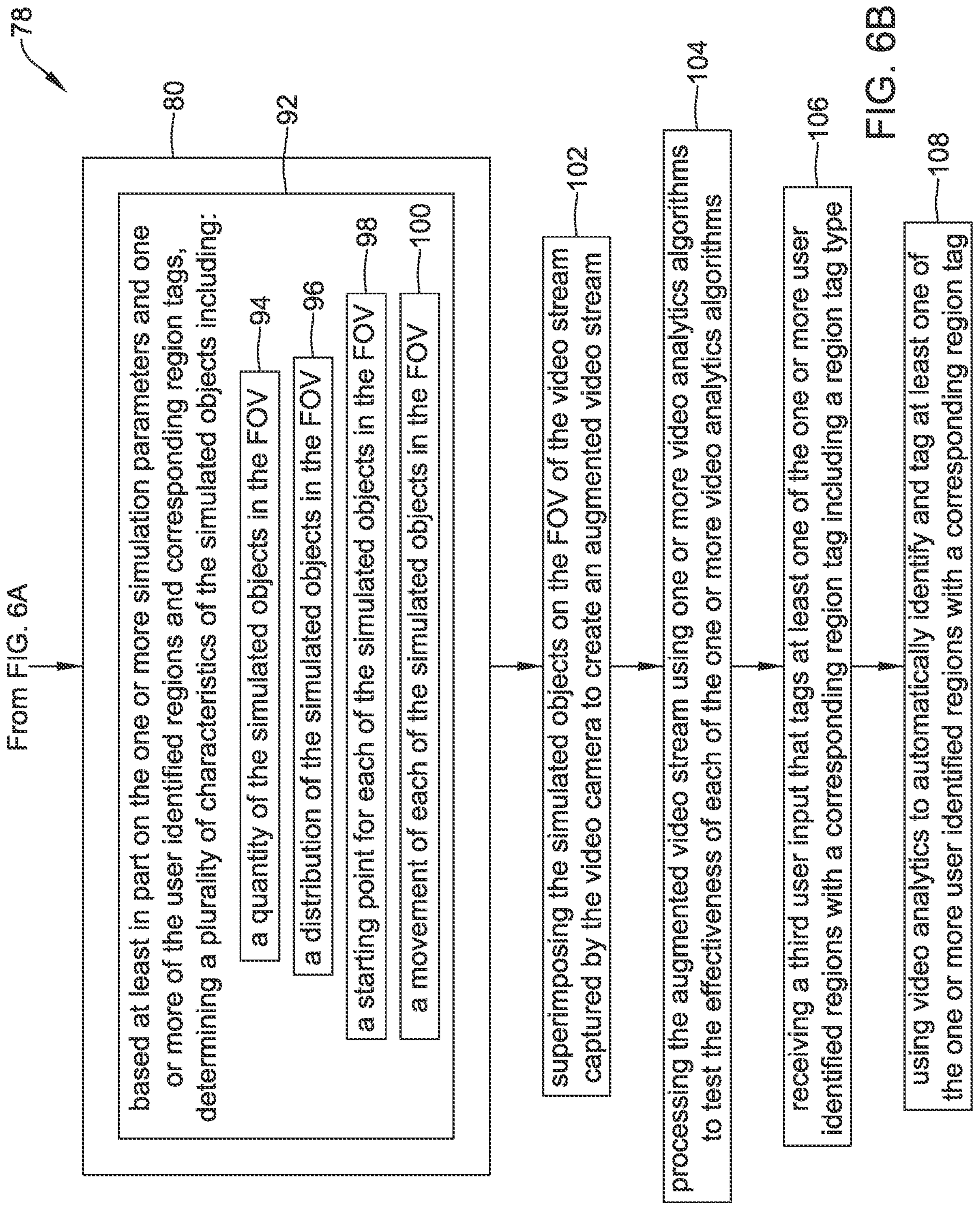

FIGS. 6A and 6B are flow diagrams that together show an illustrative computer-implemented method 78 for testing one or more video analytics algorithms (such as the video analytics algorithms 20) of a video surveillance system (such as the video surveillance system 10). The video surveillance system includes a video camera (such as the video camera 12) having a field of view (FOV) (such as the FOV 14) that encompasses part of a facility. The illustrative method 78 includes generating simulated objects that are to be superimposed on a video stream captured by the video camera, as indicated at block 80. In some instances, the simulated objects may include a person, an animal or a vehicle. The simulated objects may include inanimate objects such as bags, laptops, chairs and other furniture, for example. In some instances, generating the simulated objects include displaying an image captured by the video camera on a display, as indicated at block 82. In some instances, generating the simulated objects include receiving a first user input that identifies one or more user identified regions relative to the image, as indicated at block 84.

In some instances, receiving first user input may include drawing annotations on the image while displayed on a display screen to identify the one or more user identified regions. The annotations may indicate user identified regions that include possible obstructions that may interfere with where the simulated objects are allowed to be placed or to move by an object simulator module. In some instances, generating the simulated objects include automatically tagging each of the one or more user identified regions with a corresponding region tag, as indicated at block 86. In some instances, the region tags may define a corresponding region type. Examples of regions and/or region types include but are not limited to one or more of a wall visible in the FOV, a fence visible in the FOV, an obstacle visible in the FOV, a secure area visible in the FOV, a window visible in the FOV, a door visible in the FOV, a pedestrian lane visible in the FOV, and a vehicle lane visible in the FOV.

In some instances, the user may draw annotations that indicate regions or areas of interest. As an example, a user may draw a box or other shape around a particular area of interest in the FOV, in which one or more video analytics algorithms are to be run. In some cases, each area of interest may be tagged to identify which of a plurality of video analytics algorithms are to be run in the associated area of interest. For example, a user may draw a shape that encompasses an area in front of a cash machine, and may tag the shape with a loitering video analytics algorithm that detects if/when people are loitering in the area of interest. In another example, a user may draw a shape that encompasses a region of a train station, and may tag the shape with a crowd detection video analytics algorithm that detects if/when a crowd of people are gathered in the area of interest. These are just examples. In another example, a user may draw a box or other shape around a particular area, noting that this area is not of interest, and there is no need to run any video analytics algorithms on this particular area. A bathroom or changing room may represent an area that is not of interest. This is just an example.

In some instances, generating the simulated objects include receiving a second user input that is used to identify one or more simulation parameters, as indicated at block 88. In some instances, one or more of the simulation parameters are based at least in part on the second user input, as indicated at block 90. In some instances, and as continued on FIG. 6B, generating the simulated objects include, based at least in part on the one or more simulation parameters and one or more of the user identified regions and corresponding region tags, determining a plurality of characteristics of the simulated objects, as indicated at block 92. The plurality of characteristics of the simulated objects include, for example, determining where each of the one or more simulated objects are allowed to move in the FOV and/or where each of the one or more simulated objects are not allowed to move based on the one or more user identified regions and corresponding region tags.

In some instances, the characteristics of the simulated objects include a quantity of the simulated objects in the FOV, as indicated at block 94. In some instances, the characteristics of the simulated objects include a distribution and/or distribution type of the simulated objects in the FOV, as indicated at block 96. In some instances, the characteristics of the simulated objects include a starting point (e.g. time and/or location) for each of the simulated objects in the FOV, as indicated at block 98. In some instances, the characteristics of the simulated objects include a movement (e.g. speed, movement type) of each of the simulated objects in the FOV, as indicated at block 100. In some instances, the characteristics of the simulated objects may be influenced by the regions of interest indicated by the user. The simulated objects may be directed into or through a region of interest, particularly for testing a particular video analytics algorithm. The simulated objects may be directed away from areas not of interest, as running video analytics algorithms on these areas may be viewed as a waste of computing resources.

In some instances, the method 78 includes superimposing the simulated objects on the FOV of the video stream captured by the video camera to create an augmented video stream, as indicated at block 102. The method 78 may include processing the augmented video stream using one or more video analytics algorithms to test the effectiveness of each of the one or more video analytics algorithms, as indicated at block 104. The one or more video analytics algorithms may include, but are not limited to, one or more of a crowd detection algorithm (e.g. crowd present or forming), a crowd analytics algorithm (e.g. size of crowd, rate of crowd formation or dispersion, density of crowd, movement within the crowd, movement of the crowd, etc.), a people count algorithm (e.g. number of people in a defined region of interest of the FOV), a behavior detection algorithm (e.g. running, walking, loitering, yelling, shop lifting, protesting, damaging property, tailgating through a secure entry point, wearing a mask, social distancing, etc.), an intrusion detection algorithm (e.g. entering a secure area), a perimeter protection algorithm (e.g. crossing a security perimeter) and a tailgating detection algorithm (e.g. tailgating through a secure entry point). These are just examples. In some instances, the method 78 may include receiving a third user input that tags at least one of the one or more user identified regions with a corresponding region tag including a region tag type, as indicated at block 106. The method 78 may include using video analytics to automatically identify and tag at least one of the one or more user identified regions with a corresponding region tag, as indicated at block 108. That is, the video analytics may be used to identify walls, doors, windows, fences, parking spaces and other regions in the FOV and automatically and tag each of the identified regions with an appropriate region tag. The method 78 may include using video analytics to automatically identify and tag at least some areas, including one or more user identified regions, as not being of interest. A potential person of interest is unlikely to materialize through a solid wall, for example.

In some instances, the one or more simulation parameters may include one or more of an object type of one or more of the simulated objects, a measure related to a number of simulated objects, a distribution of two or more of the simulated objects, a starting point for one or more of the simulated objects, a speed of movement of one or more of the simulated objects, a variation in speed of movement of one or more of the simulated objects over time, a variation in speed of movement between two or more of the simulated objects, and a type of movement of one or more of the simulated objects. These are just examples. In some instances, the distribution of two or more of the simulated objects may include one or more of a Weilbull distribution, a Gaussian distribution, a Binomial distribution, a Poisson distribution, a Uniform distribution, a Random distribution, and a Geometric distribution. In some instances, the distribution of two or more of the simulated objects may include a mixed distribution of two or more different distributions. In some instances, the type of movement may include one or more of a random directional movement, a random directional movement constrained by movement of other simulated objects and/or constrained by user identified regions of the FOV, a directional movement along a predefined corridor, a varying speed movement, and a group movement associated with two or more of the simulated objects.

Figure 7A:
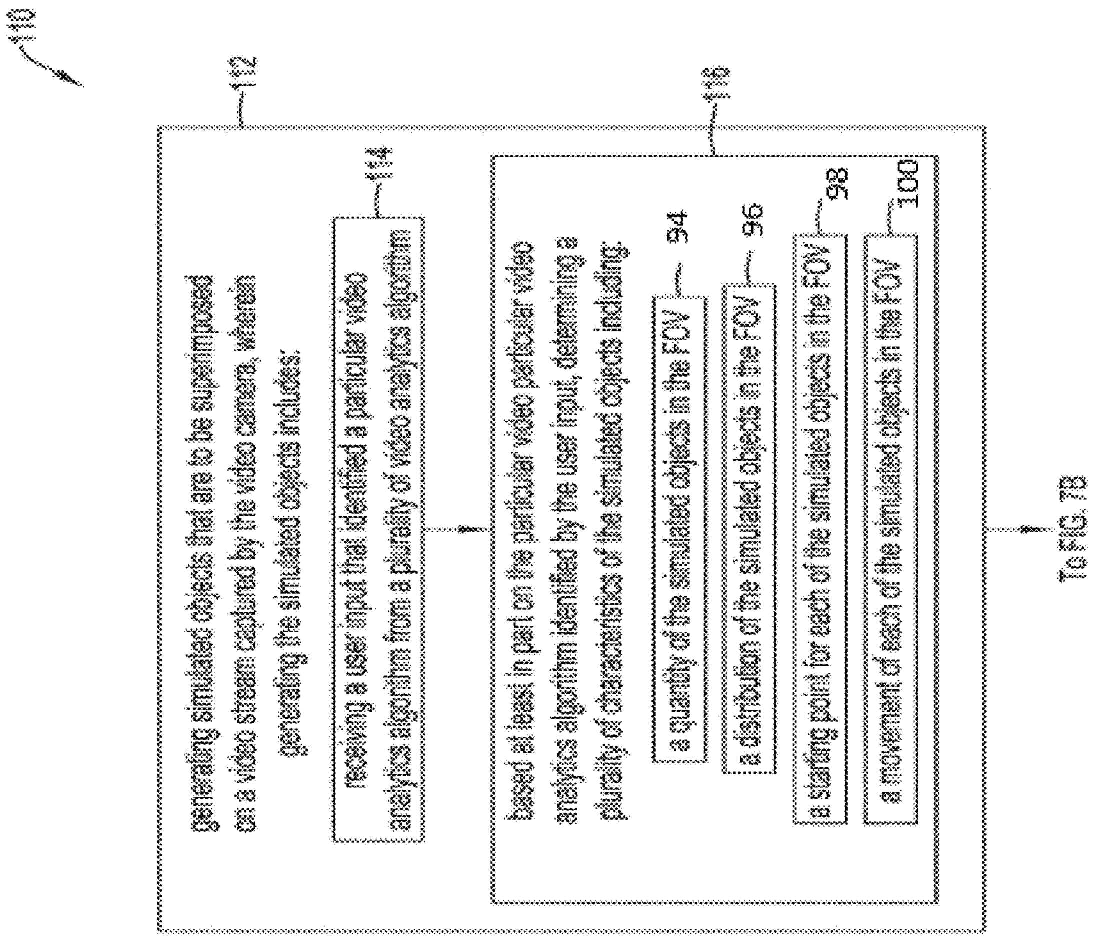
FIGS. 7A and 7B are flow diagrams that together show an illustrative computer implemented method.
Figure 7B:
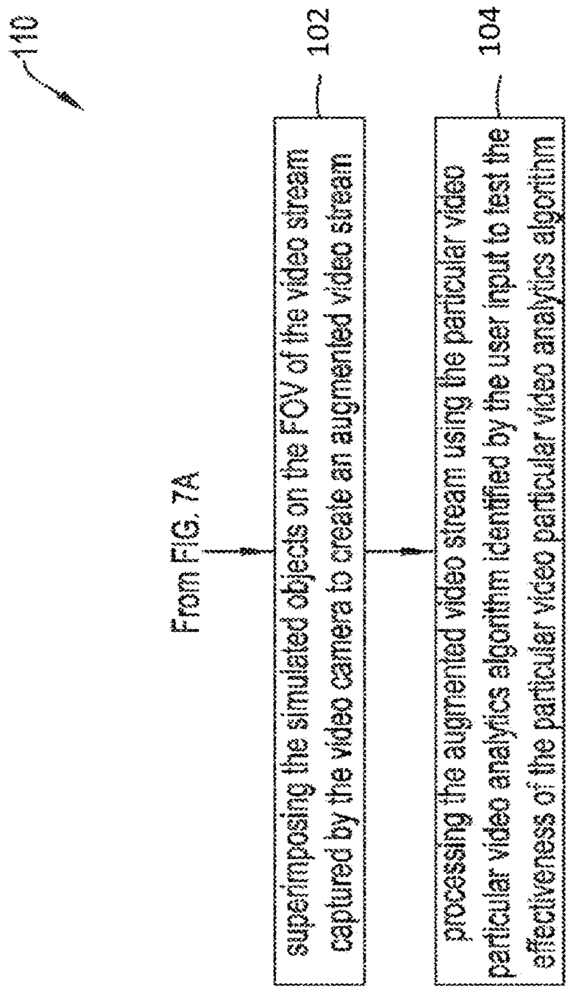

FIGS. 7A and 7B are flow diagrams that together show an illustrative computer-implemented method 110 for testing one or more video analytics algorithms (such as the video analytics algorithms 20) of a video surveillance system (such as the video surveillance system 10). The video surveillance system includes a video camera (such as the video camera 12) having a field of view (FOV) (such as the FOV 14) that encompasses part of a facility. The method 110 includes generating simulated objects that are to be superimposed on a video stream captured by the video camera, as indicated at block 112. Generating the simulated objects may include receiving a user input that identifies a particular video analytics algorithm from a plurality of video analytics algorithm, as indicated at block 114. Generating the simulated objects may include, based at least in part on the particular video particular video analytics algorithm identified by the user input, determining a plurality of characteristics of the simulated objects that are desirable for testing the particular video particular video analytics algorithm, as indicated at block 80. The plurality of characteristics of the simulated objects may include a quantity of the simulated objects in the FOV, as indicated at block 94. The plurality of characteristics of the simulated objects may include a distribution of the simulated objects in the FOV, as indicated at block 98. The plurality of characteristics of the simulated objects may include a starting point for each of the simulated objects in the FOV, as indicated at block 122. The plurality of characteristics of the simulated objects may include a movement of each of the simulated objects in the FOV, as indicated at block 100. The plurality of characteristics of the simulated objects may include a location or region in the FOV of one or more of the simulated objects in the FOV. These are just examples.

The method 110 continues on FIG. 7B, with superimposing the simulated objects on the FOV of the video stream captured by the video camera to create an augmented video stream, as indicated at block 126. The augmented video stream is processed using the particular video particular video analytics algorithm identified by the user input to test the effectiveness of the particular video particular video analytics algorithm, as indicated at block 104. In some instances, the particular video analytics algorithm may include one of a crowd detection algorithm (e.g. crowd present or forming), a crowd analytics algorithm (e.g. size of crowd, rate of crowd formation or dispersion, density of crowd, movement within the crowd, movement of the crowd, etc.), a people count algorithm (e.g. number of people in a defined region of interest of the FOV), a behavior detection algorithm (e.g. running, walking, loitering, yelling, shop lifting, protesting, damaging property, tailgating through a secure entry point, wearing a mask, social distancing, etc.), an intrusion detection algorithm (e.g. entering a secure area), a perimeter protection algorithm (e.g. crossing a security perimeter) and a tailgating detection algorithm (e.g. tailgating through a secure entry point). These are just examples. In some instances, the user input may include user input selecting one or more video analytics algorithms from the plurality of video analytics algorithms for use in conjunction with the video stream of the video camera.

Figure 8A:
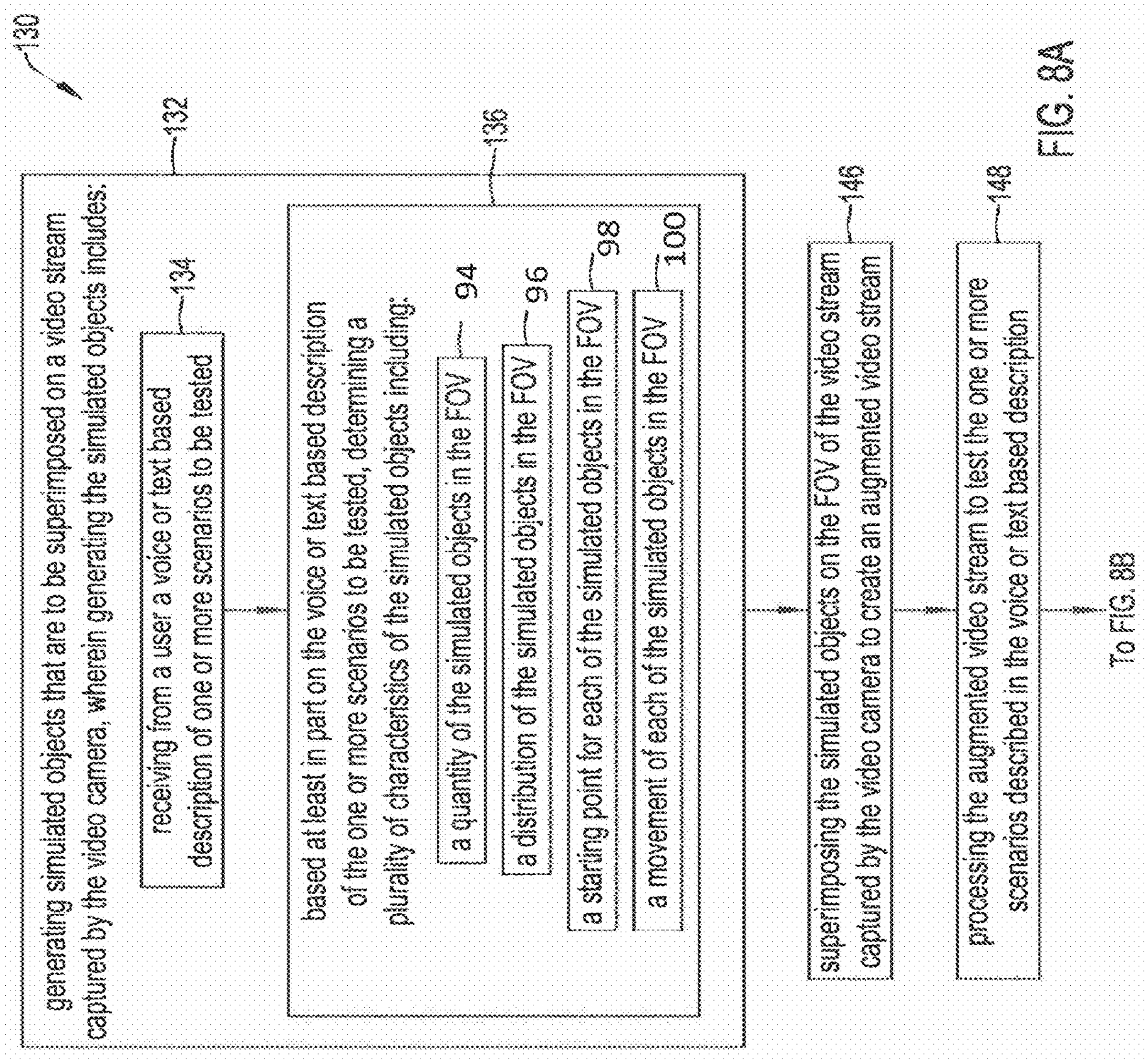
FIGS. 8A and 8B are flow diagrams that together show an illustrative computer implemented method.
Figure 8B:
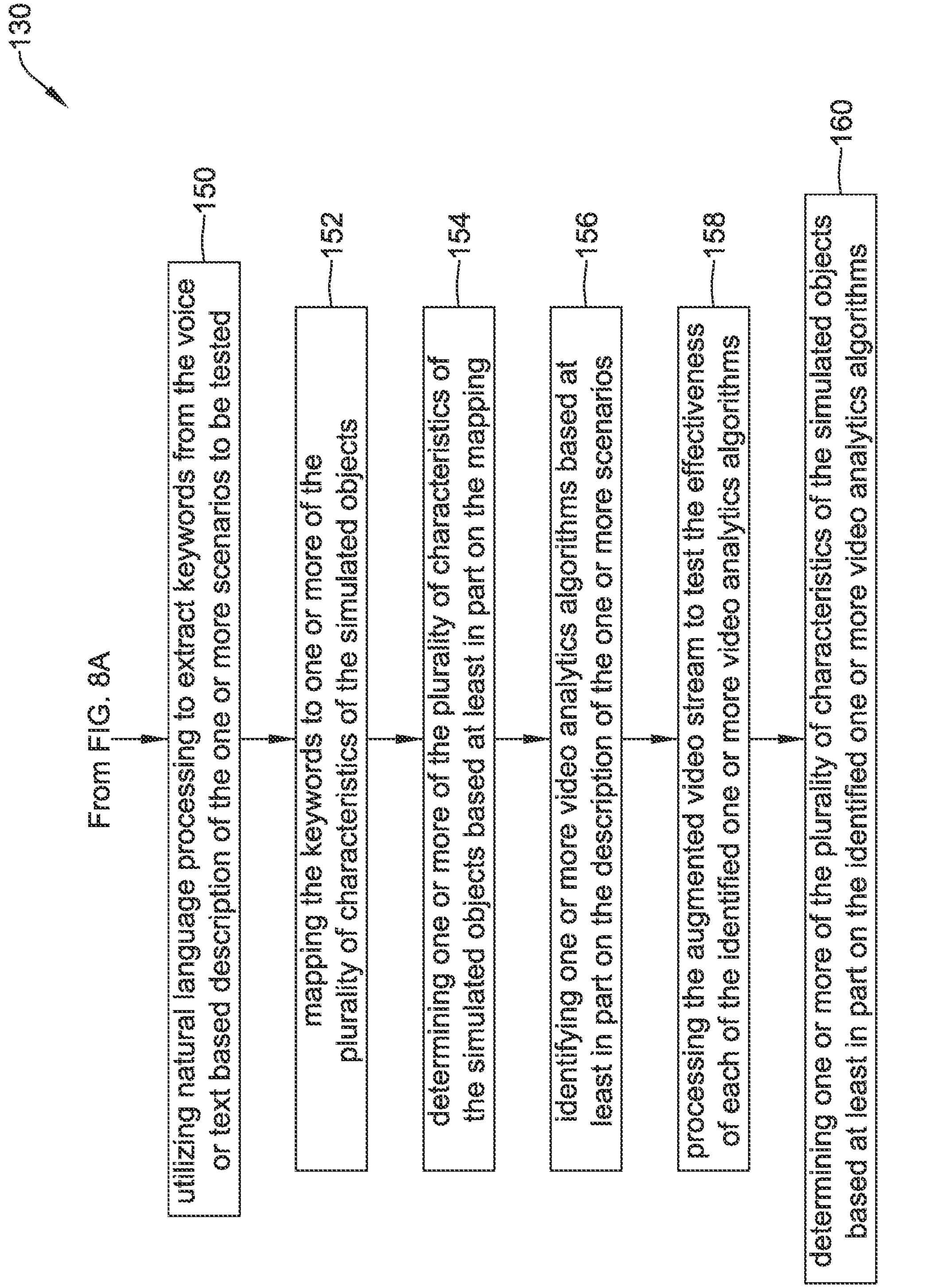

FIGS. 8A and 8B are flow diagrams that together show a computer-implemented method 130 for testing a video surveillance system (such as the video surveillance system 10) including a video camera (such as the video camera 12) having a field of view (FOV) (such as the FOV 14) that encompasses a region of a facility. The illustrative method 130 includes generating simulated objects that are to be superimposed on a video stream captured by the video camera, as indicated at block 132. Generating the simulated objects may include receiving from a user a voice or text based description of one or more scenarios to be tested, as indicated at block 134. Generating the simulated objects may include determining a plurality of characteristics of the simulated objects based at least in part on the voice or text based description of the one or more scenarios to be tested, as indicated at block 80. The characteristics of the simulated objects may include a quantity of the simulated objects in the FOV, as indicated at block 94. The characteristics of the simulated objects may include a distribution of the simulated objects in the FOV, as indicated at block 98. The characteristics of the simulated objects may include a starting point for each of the simulated objects in the FOV, as indicated at block 142. The characteristics of the simulated objects may include a movement of each of the simulated objects in the FOV, as indicated at block 100. These are just example characteristics of the simulated objects. The illustrative method 130 further includes superimposing the simulated objects on the FOV of the video stream captured by the video camera to create an augmented video stream, as indicated at block 146. The augmented video stream is processed to test the one or more scenarios described in the voice or text based description, as indicated at block 104.

In some instances, and continuing on FIG. 8B, the method 130 may include utilizing natural language processing to extract keywords from the voice or text based description of the one or more scenarios to be tested, as indicated at block 150. The keywords may be mapped to one or more of the plurality of characteristics of the simulated objects, as indicated at block 152. One or more of the plurality of characteristics of the simulated objects may be determined based at least in part on the mapping, as indicated at block 154. In some instances, one or more video analytics algorithms may be identified based at least in part on the description of the one or more scenarios, as indicated at block 156. The augmented video stream may be processed to test the effectiveness of each of the identified one or more video analytics algorithms, as indicated at block 158. In some instances, the method 130 may further include determining one or more of the plurality of characteristics of the simulated objects based at least in part on the identified one or more video analytics algorithms, as indicated at block 160.

In one example, a voice or text based description may be "Test for an unauthorized entry through door A of region 1". When the description is voice based, the description may be converted to text based through a voice to text translator. The system may parse the voice or text based description and identify the phrases "door A" and "region 1". From these phrases, the system may identify which video camera(s) of the video surveillance system 10 has a FOV that incudes door A of region 1. The system may also parse the voice or text based description and identify the phrase "unauthorized entry". This phrase may be mapped to one of a plurality of video analytics algorithms, such as an intrusion detection video analytics algorithm (or an unauthorized entry detection video analytics algorithm). The system may then be configured to automatically identify characteristics of the simulated objects that are suitable for testing the identified video analytics algorithm, namely the intrusion detection video analytics algorithm, for an intrusion of door A of region 1. The system may then superimpose simulated objects with the identify characteristics on the FOV of the video stream captured by the identified video camera to create an augmented video stream. The system may then process the augmented video stream using the particular video analytics algorithm (e.g. the intrusion detection video analytics algorithm) to test the effectiveness of the particular video particular video analytics algorithm (e.g. the intrusion detection video analytics algorithm) to identify an intrusion of door A of region 1.

In another example, a voice or text based description may be "Do crowd detection in region 4". The system may parse the voice or text based description and identify the phrases "region 4". From this phrases, the system may identify which video camera(s) of the video surveillance system 10 has a FOV that incudes region 4. The system may also parse the voice or text based description and identify the phrase "crowd detection". This phrase may be mapped to one of a plurality of video analytics algorithms, such as a crowd detection video analytics algorithm. The system may then be configured to automatically identify characteristics of the simulated objects that are suitable for testing the identified video analytics algorithm, namely the crowd detection video analytics algorithm in region 4. The system may then superimpose simulated objects with the identify characteristics on the FOV of the video stream captured by the identified video camera to create an augmented video stream. The system may then process the augmented video stream using the particular video analytics algorithm (e.g. crowd detection video analytics algorithm) to test the effectiveness of the particular video particular video analytics algorithm (e.g. crowd detection video analytics algorithm) to identify a crowd in region 4. This approach may facilitate testing the video surveillance system 10 from a remote device and/or remote location.

The mappings between the various phrases of the or text based description and the locations and/or video analytics algorithm may be stored in a mapping table. In some cases, the mappings may be learned over time by an artificial intelligence model, and once trained, the artificial intelligence model may automatically produce an appropriate test of the video surveillance system 10 based on the voice or text based description.

Figure 9:
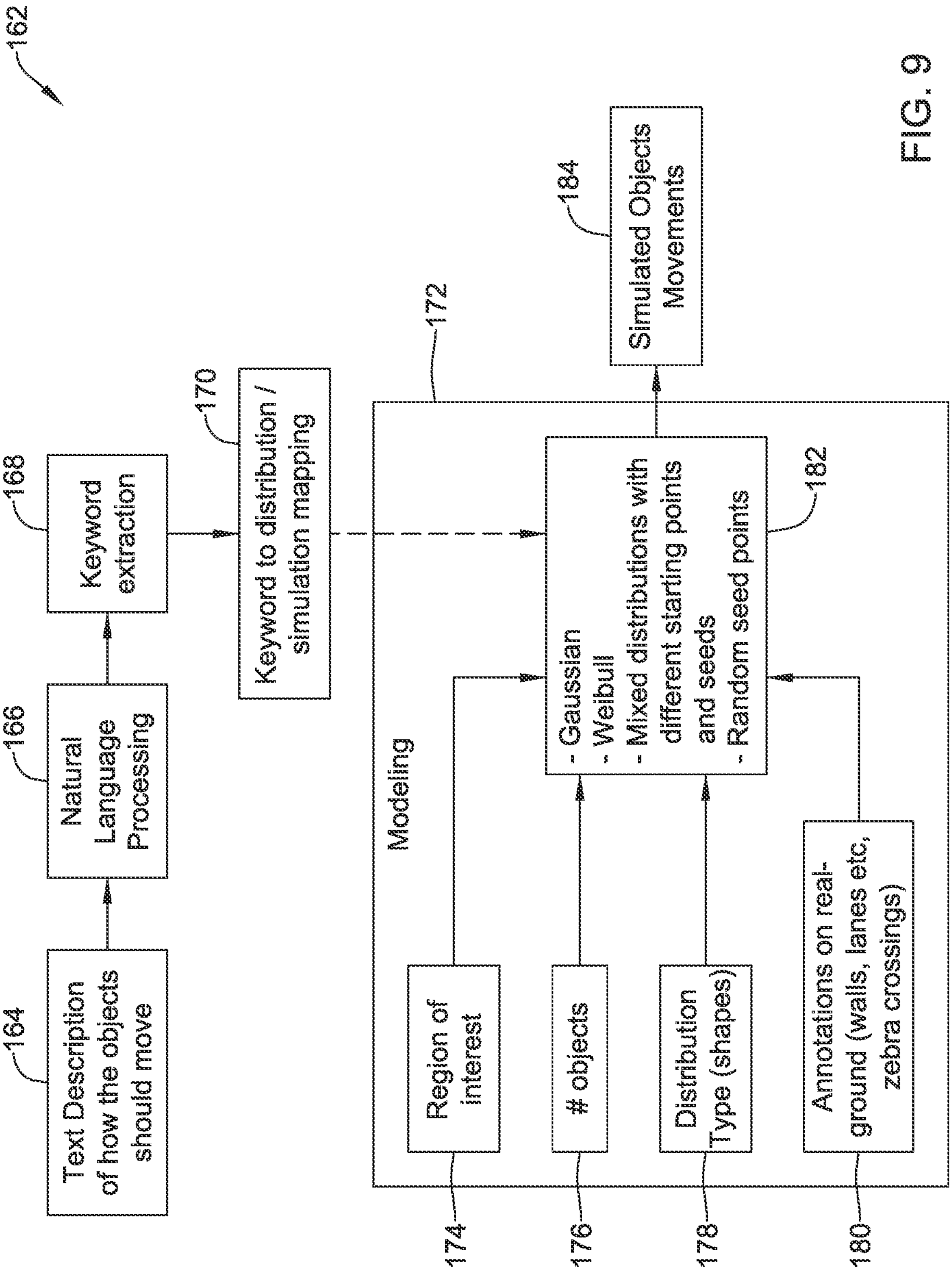
FIG. 9 is a schematic block diagram of an illustrative object simulation module.

FIG. 9 is a schematic block diagram of an illustrative object simulation module 162. The illustrative object simulation module 162 includes receiving a text description of how the simulated objects should move, as indicated at block 164. Natural language processing may be used to analyze the text description, as indicated at block 166. As a result, keywords are extracted, as indicated at block 168. The keywords are mapped to a simulation, as indicated at block 170. The mapping is one of the inputs to a modeling block 172. Additional inputs may include one or more of a region of interest 174, a number of objects 176, a distribution type (e.g. a Weilbull distribution, a Gaussian distribution, a Binomial distribution, a Poisson distribution, a Uniform distribution, a Random distribution, a Geometric distribution, a mixed distribution) 178, annotations 180 that identifies walls, doors, windows, fences, parking spaces and other regions in the FOV, and in some cases object movement type (e.g. walking, running, loitering), which are all provided to a distribution block 182. The output from the distribution block 182, based upon all of these inputs, is simulated object movements, as indicated at block 184. The simulated object movements are then superimposed on a video stream from a video camera to test the effectiveness of one or more video analytics algorithms at the site.

Figure 10:
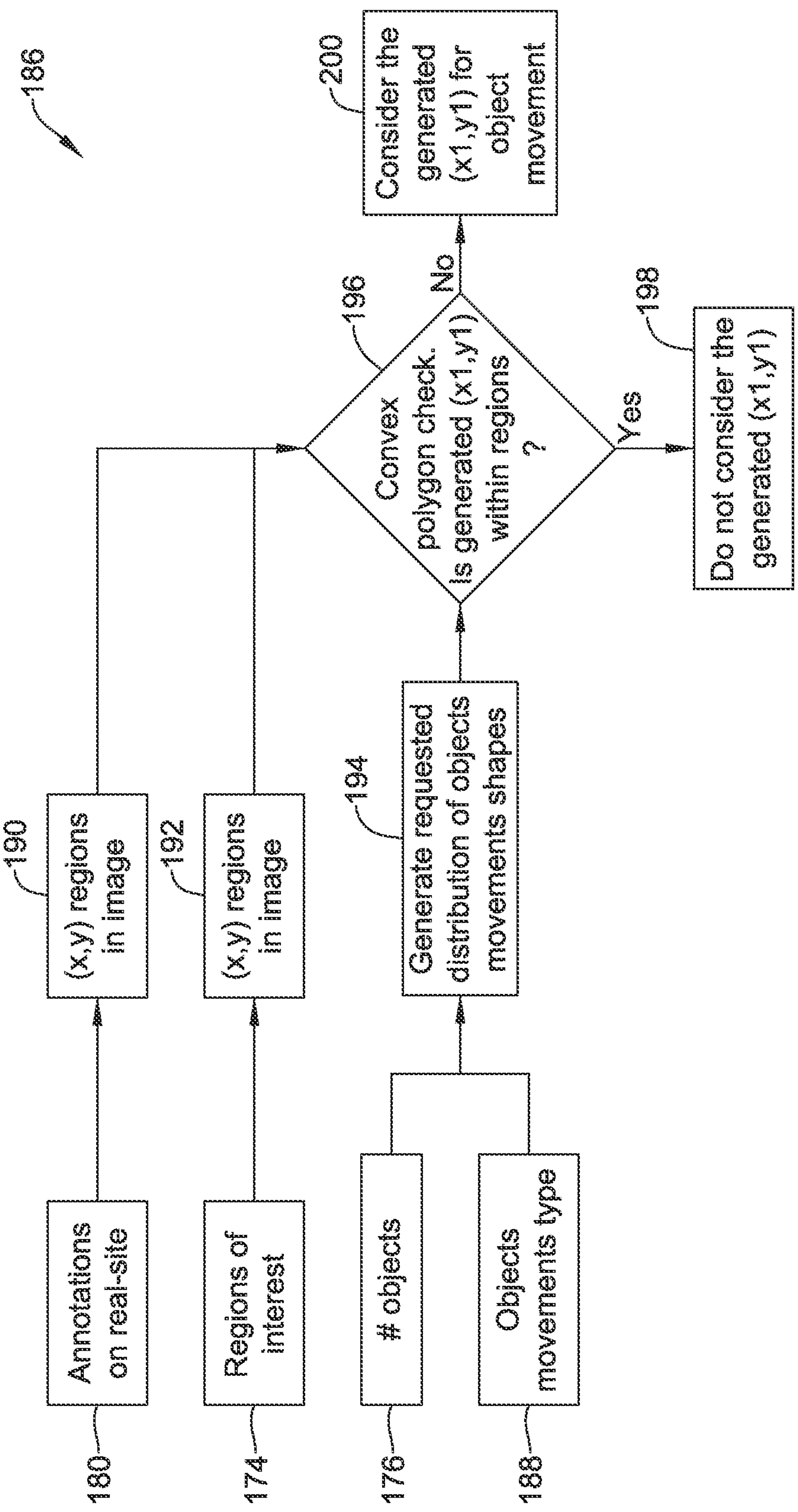
FIG. 10 is a schematic block diagram of an illustrative method for generating object movements for a video stream to create an augmented video stream.

FIG. 10 is a schematic block diagram of an illustrative method 186 for generating object movements for a video stream to create an augmented video stream. The illustrative method 186 begins with several of the inputs shown in FIG. 9, including the region of interest 174, the number of objects 176 and the annotations 180. The method 186 also includes object movement types 188. The annotations 180 and/or regions of interest 174 are converted into X,Y regions on the FOV of the video stream, as indicated at block 190 and 192, respectively. The number of objects 176 and the object movement type 188 are provided to a block 194, where a requested distribution of objects, object movements, and object shapes are generated. The object shapes may be different for different object types. For example, an adult person may have a larger size than a child. In another example, a vehicle may have a larger size and different shape from an adult person. Also, the distribution of the objects, the object movements and object shaped may be scaled depending on the location of objects in the field of view. For example, objects located in the top region of the FOV may be further from the camera, and thus may have a tighter distribution (on a pixels-by-pixel basis), a slower movement (on a pixels-by-pixel basis) and a smaller size (on a pixels-by-pixel basis) than objects that are located in the bottom region of the FOV.

The blocks 190, 192 and 194 each provide information to a decision block 196, where a determination is made as to whether the object simulator is attempting to move a polygon shape (an object) into one of the regions received from the block 190 or the block 192. If yes, control passes to block 198, and the simulator does not move the object to position (x1, y1). If not, control passes to block 200, and the simulator does move the object to position (x1, y1).

In this embodiment, both blocks 190 and 192 defined regions where the simulator is not allowed to move objects. In other embodiments, one of the regions, such as the region defined by block 192, may represent a region that the simulator is encourage to move objects. For example, if attempting to test a crowd detection algorithm in region A of the FOV, the region defined by block 192 may correspond to region A and the simulator may be encouraged to even required to move one or more objects into the region defined by block 192. In this embodiment, the decision block 196 may determine whether the object simulator is attempting to move a polygon shape (an object) into the region defined by block 192. If yes, the simulator is encouraged to move the object to position (x1, y1). If not, the simulator is not encouraged but is still allowed to move the object to position (x1, y1). In this embodiment, control is not passed to blocks 198 or 200.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A computer implemented method for analyzing one or more video analytics algorithms of a video surveillance system of a facility, the video surveillance system including a video camera having a field of view (FOV) that encompasses part of the facility, the method comprising:

receiving a user input that identifies a selected video analytics algorithm from a plurality of video analytics algorithms for execution on a video stream captured by the video camera;

generating simulated objects that are to be superimposed on a video stream captured by the video camera based at least in part on the selected video analytics algorithm identified by the user input, wherein generating the simulated objects includes:

determining a plurality of characteristics of the simulated objects for analyzing the selected video analytics algorithm including one or more of:

a quantity of the simulated objects in the FOV;

a distribution of the simulated objects in the FOV;

a starting point for each of the simulated objects in the FOV;

a movement of each of the simulated objects in the FOV;

superimposing the simulated objects with the plurality of characteristics on the FOV of the video stream captured by the video camera to create an augmented video stream; and processing the augmented video stream using the selected video analytics algorithm to analyze selected video analytics algorithm;

wherein the plurality of characteristics of the simulated objects include one or more of:

an object type of one or more of the simulated objects;

a count related to a number of simulated objects;

a distribution of two or more of the simulated objects;

a starting point for one or more of the simulated objects;

a speed of movement of one or more of the simulated objects;

a variation in speed of movement of one or more of the simulated objects over time;

a variation in speed of movement between two or more of the simulated objects; and a type of movement of one or more of the simulated objects;

wherein the distribution of two or more of the simulated objects comprises a combination of at least two different distribution types selected from the group consisting of a Weilbull distribution, a Gaussian distribution, a Binomial distribution, a Poisson distribution, a Uniform distribution, a Random distribution, and a Geometric distribution.

2. The method of claim 1, comprising:

tagging each of one or more regions of the FOV of the image with a corresponding region tag, wherein the region tag define a region type.

3. The method of claim 2, wherein the region type includes one or more of a wall, a fence, an obstacle, a secure area, a window, a door, a pedestrian lane, and a vehicle lane.

4. The method of claim 3, wherein determining the plurality of characteristics of the simulated objects includes determining where each of the one or more simulated objects are allowed to move in the FOV, where each of the one or more simulated objects are not allowed to move based on the one or more user identified regions and corresponding region tags, or both.

5. The method of claim 1, wherein the simulated objects include one or more of a person, an animal and a vehicle.

6. The method of claim 1, wherein the plurality of one or more video analytics algorithms include one or more of a crowd detection algorithm, a crowd analytics algorithm, a people count algorithm, a behavior detection algorithm, an intrusion detection algorithm, a perimeter protection algorithm and a tailgating detection algorithm.

7. The method of claim 2, comprising receiving a first user input that identifies one or more of the regions, wherein the first user input includes drawing annotations on the image while displayed on a display screen.

8. The method of claim 2, comprising receiving a second user input that tags at least one of the one or more regions with a corresponding region tag including a region tag type.

9. The method of claim 2, comprising using video analytics to automatically identify and tag at least one of the one or more user identified regions with a corresponding region tag.

10. The method of claim 1, wherein the plurality of characteristics of the simulated objects includes the type of movement of one or more of the simulated objects, wherein the type of movement includes one or more of a random directional movement, a random directional movement constrained by movement of other simulated objects, constrained by user identified regions of the FOV, a directional movement along a predefined corridor, a varying speed movement, a group movement associated with two or more of the simulated objects, or any combination thereof.

* * * * *